(12) United States Patent
Calley

(10) Patent No.: US 6,924,579 B2
(45) Date of Patent: Aug. 2, 2005

(54) ELECTRICAL MACHINE

(76) Inventor: David Calley, 10220 Ciervo Trail, Flagstaff, AZ (US) 86004

( * ) Notice: Subject to any disclaimer, the term of this patent is extended or adjusted under 35 U.S.C. 154(b) by 0 days.

(21) Appl. No.: 10/721,765

(22) Filed: Nov. 25, 2003

(65) Prior Publication Data

US 2004/0150288 A1  Aug. 5, 2004

Related U.S. Application Data

(63) Continuation-in-part of application No. 10/273,238, filed on Oct. 17, 2002, now Pat. No. 6,664,704.
(60) Provisional application No. 60/333,248, filed on Nov. 23, 2001.

(51) Int. Cl.[7] ............................ H02K 1/00; H02K 21/02
(52) U.S. Cl. ................. 310/257; 310/152; 310/154.02; 310/156.02; 310/164; 310/216; 310/254
(58) Field of Search ................................. 310/113, 152, 310/154, 156, 162–164, 216, 254, 261, 266, 257

(56) References Cited

U.S. PATENT DOCUMENTS

| | | | | |
|---|---|---|---|---|
| 2,078,668 A | * | 4/1937 | Kilgore ...................... 310/258 |
| 3,437,854 A | * | 4/1969 | Oiso ........................ 310/49 R |
| 3,710,158 A | * | 1/1973 | Bachle et al. .......... 310/156.02 |
| 4,021,691 A | * | 5/1977 | Dukshtau et al. ........... 310/217 |
| 4,237,396 A | * | 12/1980 | Blenkinsop et al. ... 310/154.06 |
| 4,658,166 A | * | 4/1987 | Oudet .................... 310/156.02 |
| 4,900,965 A | * | 2/1990 | Fisher ....................... 310/216 |
| 5,051,641 A | * | 9/1991 | Weh ........................... 310/163 |
| 5,117,142 A | * | 5/1992 | von Zweygbergk .... 310/156.02 |
| 5,212,419 A | * | 5/1993 | Fisher et al. ................ 310/254 |
| 5,382,859 A | * | 1/1995 | Huang et al. ............... 310/216 |
| 5,633,551 A | * | 5/1997 | Weh ........................... 310/266 |
| 5,773,910 A | * | 6/1998 | Lange ........................ 310/266 |
| 5,777,418 A | * | 7/1998 | Lange et al. ................ 310/255 |
| 5,894,183 A | * | 4/1999 | Borchert .................... 310/261 |
| 5,973,436 A | * | 10/1999 | Mitcham .................... 310/266 |
| 6,060,810 A | * | 5/2000 | Lee et al. ................... 310/254 |
| 6,154,013 A | * | 11/2000 | Caamano .................... 322/89 |
| 6,163,097 A | * | 12/2000 | Smith et al. ................ 310/261 |
| 6,177,748 B1 | * | 1/2001 | Katcher et al. ............ 310/209 |
| 6,232,693 B1 | * | 5/2001 | Gierer et al. ............... 310/214 |
| 6,236,131 B1 | * | 5/2001 | Schafer ...................... 310/163 |
| 6,455,970 B1 | * | 9/2002 | Shafer et al. ............... 310/179 |
| 6,492,758 B1 | * | 12/2002 | Gianni et al. ............... 310/257 |
| 6,657,329 B2 | * | 12/2003 | Kastinger et al. ......... 310/49 R |

FOREIGN PATENT DOCUMENTS

| | | | |
|---|---|---|---|
| DE | 3602687 | * | 8/1987 |
| DE | 3927453 | * | 2/1991 |
| DE | 19634949 | * | 5/1998 |
| EP | 1063754 | * | 12/2000 |

* cited by examiner

Primary Examiner—Burton Mullins
(74) Attorney, Agent, or Firm—John Vanden Bosche

(57) ABSTRACT

A motor/alternator is formed by a single toroidal magnet and flux conductors which, in combination with flux switches, create an alternating magnetic circuit around a power coil. The motor/alternator geometry minimizes flux leakage. The form of the flux conductor and flux switch terminations allows for a high number of poles and reduces magnetic reluctance.

8 Claims, 3 Drawing Sheets

ELECTRICAL MACHINE

RELATED APPLICATIONS

This application is a Continuation In Part of U.S. patent application Ser. No. 10/273,238 which was filed on Oct. 17, 2002 now U.S. Pat. No. 6,664,704 and which claimed priority under 35 U.S.C. §119(e) to U.S. Provisional Patent Application No. 60/333,248 which was filed on Nov. 23, 2001.

FIELD OF THE INVENTION

Embodiments of the invention relate to an electrical machine that can function as either a motor or a generator. The machine uses high frequency commutation of magnetic flux to achieve high efficiency and high power density.

BACKGROUND OF THE INVENTION

In co-pending U.S. patent application Ser. No. 10/273,238, included herein by reference, an electrical machine is described which uses a plurality of flux conductors interspersed with each other around the circumference of the machine. Each of these flux conductors has opposite magnetic polarity to the adjacent flux conductors. In this design the number of flux conductors which could be arranged around a circumference was limited by the necessity of leaving an air gap between adjacent laminates sufficient to minimize flux leakage. Nevertheless, a certain amount of flux leakage is inevitable in this design. It would be advantageous to provide a design which allows for closer spacing of laminates, thus allowing for a greater number of poles and decreasing the amount of flux leakage inherent in the geometry.

Co-pending U.S. patent application Ser. No. 10/273,238 describes flux switches which magnetically connect with the flux conductors over a small air gap between flat terminations. There is a certain amount of reluctance to flux passage which is dictated by the width of the air gap and the surface area of the air gap. It would be advantageous to provide a flux switch geometry which would increase the surface area of the air gap thus reducing magnetic reluctance between the flux switch and the flux conductor.

Furthermore, the thickness of the flux switches in the Calley patent is limited by the necessity not to bridge the gap between adjacent flux conductors at the point of connection. By thus limiting the thickness of the flux switches to the thickness of the termination at the connection point a high flux density is indicated for the entire flux switch substantially similar to that at the termination point. It would be advantageous to provide a way to decrease flux density in the bulk of the flux conductor.

SUMMARY OF THE INVENTION

The present invention discloses improvements to the electrical machine described in co-pending U.S. patent application Ser. No. 10/273,238. These improvements substantially increase the performance of the electrical machine described in co-pending U.S. patent application Ser. No. 10/273,238 by decreasing flux loss and allowing for a greater number of poles to be used in the same diameter machine.

The present invention alters the geometry such that the flux conductors are no longer interspersed with each other. By doing so, the amount of area for passive flux leakage is greatly reduced and the number of poles is only limited by the thickness of material at the terminal ends of the flux switches and flux conductors.

Magnetic losses are reduced using the improvements of the present invention by forming the flux conductors and flux switches with a tapered thickness near their terminal ends. Thus the body of the flux switch experiences lower flux density than the termination thereby minimizing the volume of material experiencing high flux densities. The tapered ends of the flux switches also allow adjacent pairs of flux conductors and switches to be placed in closer proximity to each other, thereby increasing the number of poles that are possible for a machine of a given diameter. The tapered ends of the flux conductors and flux switches reduce the span required to contact two adjacent flux conductors simultaneously, thereby allowing closer placement of adjacent flux conductors.

Magnetic reluctance is reduced by providing serrated terminations to the flux switches and flux conductors. By intermeshing these serrations the surface area of the connection between the two is greater and thus the magnetic reluctance of the gap is reduced.

BRIEF DESCRIPTION OF THE DRAWINGS

Features and advantages according to embodiments of the invention will be apparent from the following Detailed Description taken in conjunction with the accompanying drawings, in which.

DETAILED DESCRIPTION OF THE DRAWINGS

The present invention in the form of an improvement to an electrical machine described in co-pending U.S. patent application Ser. No. 10/273,238, incorporated herein by reference, consists of several aspects designed to limit magnetic flux leakage and improve flow of magnetic flux, each of which can be used singly or in combination to improve performance.

Figure 1:
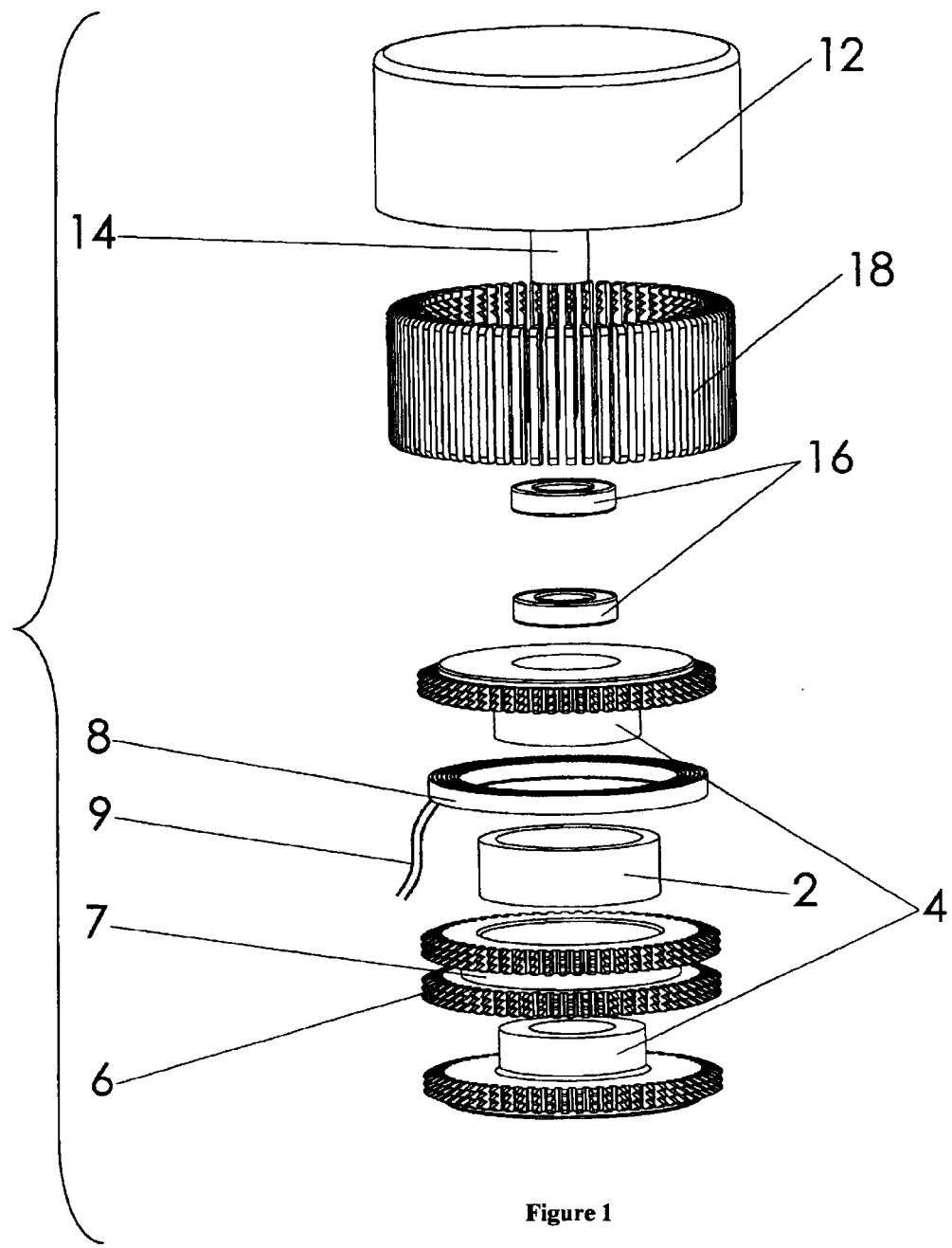
FIG. 1 shows an exploded view of an electrical machine according to an embodiment of the present invention.

FIG. 1 shows an exploded assembly view of an electrical machine employing all parts of the improvement of the present invention. FIG. 1 shows a magnet 2 in the shape of a cylindrical shell. In this embodiment magnetic north is radially outward and magnetic south is radially inward on the cylindrical shell shaped permanent magnet 2. Although the disclosure will use this magnetic orientation exclusively as to not cause confusion it is fully within the scope of the invention to have the magnetic orientation reversed. It is also possible that the magnet 2 could be formed with the north and south poles oriented up and down, in which case the flux conductors would need to be suitably modified. A set of south flux conductors 4 are fixed such that they pass within the center of the magnet while making a good magnetic connection with the inner, south, surface of the magnet 2. A set of north flux conductors 6 are fixed around the outside of the magnet 2 and make a good magnetic connection with the outer, north, surface of the magnet 2. In this figure the south set of flux conductors 4 are shown split into two pieces and the magnet 2 and north flux conductors 6 are each a single piece. There are several ways to obtain the same resulting geometry with differently split components; for instance the south flux conductors 4 could be made of a single piece, the magnet 2 could be simply a plurality of flat magnets placed circumferentially around the south flux conductors 4 with the north poles facing outward and south poles facing inward, thus approximating a cylindrical shell, and the north flux conductors 6 could be a two piece assembly split along a diameter. Any suitable fabrication technique could be used to achieve the disclosed geometry and still be within the scope of this disclosure.

A groove 7 in the north flux conductor 6 contains a power coil 8. The power coil has leads 9 which conduct electrical power to and from the device of the present invention A rotor cup 12 is mounted on a shaft 14 which spins in bearings 16. The rotor cup 12 contains a plurality of flux switches 18 which may be manufactured individually as shown or cast and/or machined out of a single piece. The flux switches 18 may be integral with the rotor cup 12 or they may be formed as separate components and bonded to the inside of rotor cup 12. In a 60 pole electrical machine there would be sixty flux switches 18 spaced circumferentially 6 degrees apart.

Figure 2:
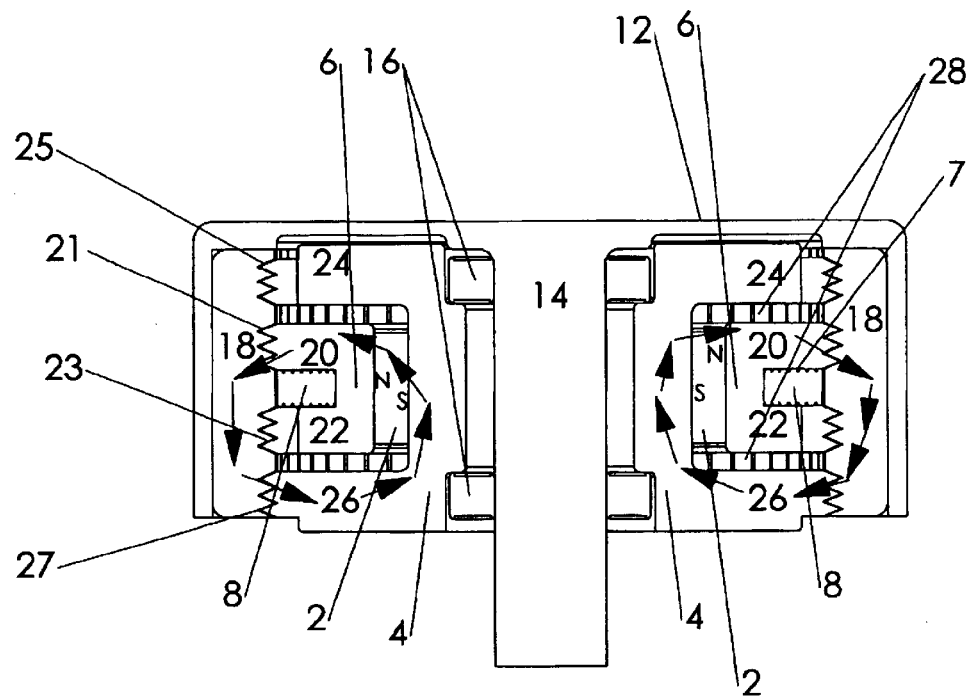
FIG. 2 shows a first cut away view according to an embodiment of the present invention.
Figure 3:
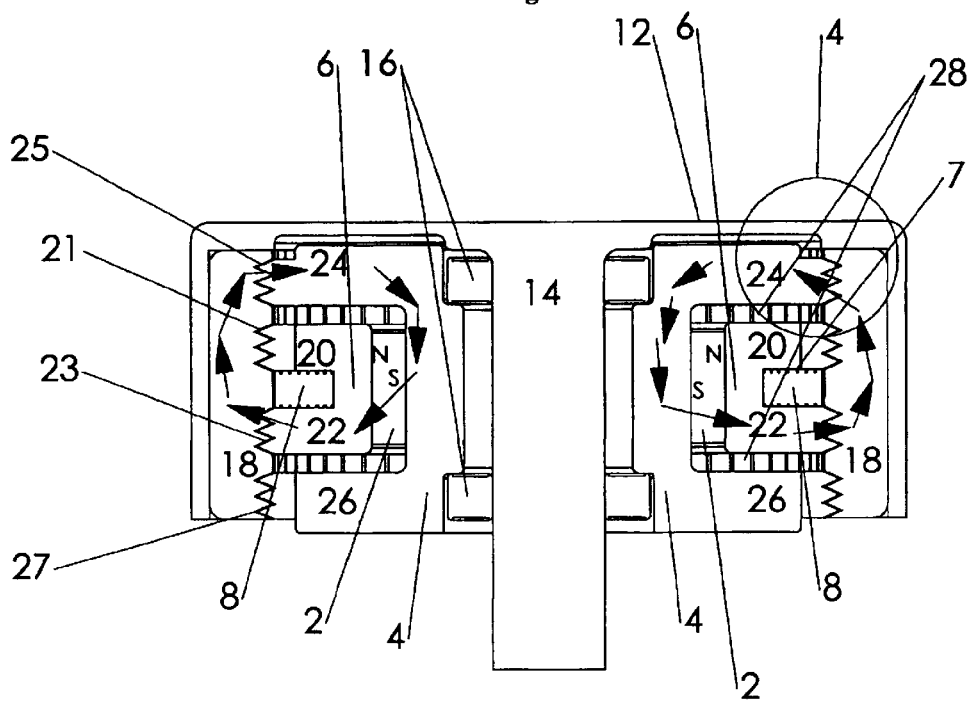
FIG. 3 shows a second cut away view according to an embodiment of the present invention.

The first aspect of the improvement of the present invention can be best illustrated by observing a cross section of the electrical machine as the rotor turns through one half cycle. FIG. 2 and FIG. 3 show the same cross section of the electrical machine one half cycle of rotation apart, so for a sixty pole machine FIG. 3 would depict the machine three degrees of rotation after FIG. 2. It should be noted that the perspective stays stationary with respect to the rotor through FIGS. 2 and 3 such that the stator, including the flux conductors 4, 6, is bisected at different points to illustrate the parts of the flux conductors 4, 6 that make contact with the flux switches 18 in each respective orientation.

FIG. 2 shows that the north flux conductor 6 has an upper portion 20 with upper terminations 21 and a lower portion 22 with lower terminations 23. Between the upper and lower portions 20, 22 is the groove 7 which contains the power coil 8. A sixty pole electrical machine would have 60 upper terminations 21 spaced six degrees apart circumferentially and 60 lower terminations 23 spaced six degrees apart circumferentially. The upper and lower terminations 21, 23 are offset from each other such that in a sixty pole machine there would be 3 degrees of offset between the upper and lower terminations 21, 23. The use of the words 'upper' and 'lower' are only used to describe the relative position in the Figures as shown. Also, the pole spacing given for a 60 pole machine is for illustrative purpose only whereas, in practice, any number of poles may be used.

FIG. 2 shows that the south flux conductor 4 has a top portion 24 with top terminations 25, and a bottom portion 26 with bottom terminations 27. Here the words top and bottom are used only to differentiate similar elements with reference to how they are positioned in the figures. Between the top and bottom portions 24, 26 of the south flux conductors 4 are contained the magnet 2, the north flux conductors 6, and the power coil 8. A gap 28 is left between the north and south flux conductors 4, 6 to minimize flux leakage between them. This gap 28 should be sufficiently large to virtually eliminate flux leakage. The gap 28 should be filled with a non magnetically conducting substance or left void. Within this gap 28, coils of wire connected to a power supply may be placed to act as an electromagnet to add to or subtract from the magnetic field of the permanent magnet 2. An electromagnet may also be placed adjacent to, and concentric with, the permanent magnet 2 to augment or subtract from the magnetic field created by permanent magnet 2. The process of augmenting a permanent magnet's field with an electromagnet is fully described in co-pending U.S. patent application Ser. No. 10/273,238. It should be noted that a first aspect of the improvement of the present invention is that this gap 28 contains much less surface area than the spaces between laminates as described in co-pending U.S. patent application Ser. No. 10/273,238. Furthermore the gap 28 may be larger, i.e. have a greater distance between north and south magnetic material as compared to the electrical machine disclosed in co-pending U.S. patent application Ser. No. 10/273,238. Thus magnetic leakage is decreased in two ways by this aspect of the improvement of the present invention, decreased surface area and greater distance between magnetic materials of opposite polarity.

Arrows in FIG. 2 show the path of magnetic flux in the improved electrical machine in a first position. Starting from the magnet 2 flux flows radially outward in the upper portion 20 of the north flux conductor 6 and passes into the flux switch 18 through the upper terminations 21 of the north flux conductors 6. It should be noted that there is no lower termination 23 of the north flux conductors 6 in contact with a flux switch 18 at the time the electrical machine is in the position shown in FIG. 2. Flux then flows down through the flux switch 18 and into the bottom portion 26 of the south flux conductor 4 through the bottom termination 27 of the south flux conductor 4. It should be noted that there is no top termination 25 of the south flux conductors 6 in contact with a flux switch 18 at the time the electrical machine is in the position shown in FIG. 2. The flux flows radially inward through the bottom portion 26 of the south flux conductor 4 and then upward and returns to the magnet 2 through the magnet's south pole. The magnetic path shown in FIG. 2 encircles the power coil 8 and causes magnetic flux to pass upward through the center of the coil 8 thus inducing current to flow in the power coil 8 into the page on the right hand side of FIG. 2 and out of the page on the left hand side of FIG. 2.

Arrows in FIG. 3 show the path of magnetic flux in the improved electrical machine in a second position one half cycle after that shown in FIG. 2. Starting from the magnet 2, flux flows radially outward in the lower portion 22 of the north flux conductor 6 and passes into the flux switch 18 through the lower termination 23 of the north flux conductors 6. It should be noted that there is no upper termination 21 of the north flux conductors 6 in contact with a flux switch 18 at the time the electrical machine is in the position shown in FIG. 3. Flux then flows up through the flux switch 18 and into the top portion 24 of the south flux conductor 4 through the top termination 25 of the south flux conductor 4. It should be noted that there is no bottom termination 27 of the south flux conductors 4 in contact with a flux switch 18 at the time the electrical machine is in the position shown in FIG. 3. The flux flows radially inward through the top portion 24 of the south flux conductor 4 and then downward and returns to the magnet 2 at the magnet's south pole. The magnetic path shown in FIG. 3 encircles the power coil 8 and causes magnetic flux to pass downward through the center of the coil 8 thus inducing current to flow in the power coil 8 out of the page on the right hand side of FIG. 3 and into the page on the left hand side of FIG. 3. Thus the current flow in the power coil 8 is reversed between the orientations shown in FIG. 2 and FIG. 3, thereby completing one half cycle.

FIGS. 2 and 3 illustrate a different flux path sequence than that disclosed in co-pending U.S. patent application Ser. No. 10/273,238 showing that there are different possible geometries within the scope of the invention using the concept of switched flux. The geometry disclosed in these embodiments provide for greater efficiency and greater number of poles in an electrical machine.

Figure 4:
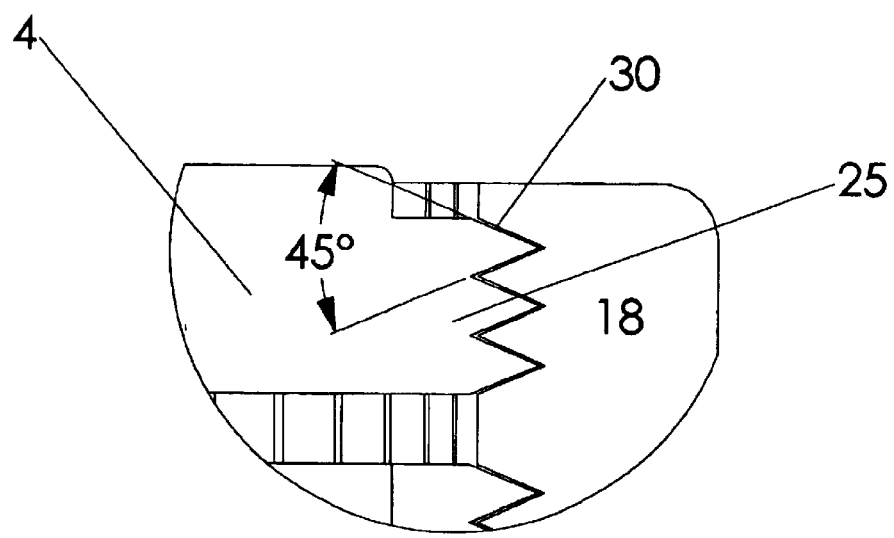
FIG. 4 shows a close-up view taken in circle 4 of FIG. 3.

FIG. 4 is a close up of the circle 4 in FIG. 3 showing a side view of a portion of a flux switch 18 and a top termination 25 of a south flux conductor 4. A second aspect of the improvement of the present invention is illustrated in the serrated edges of the termination 25 and the flux switch 18. By necessity, there is some finite thickness of air gap 30 between the termination 25 and the flux switch 18. The thickness of the air gap 30 is exaggerated in FIG. 4 for illustrative purposes. Though the air gap 30 is optimized to be as narrow as possible, this air gap 30 can be a major source of magnetic reluctance, thereby decreasing efficiency of the machine. The scale of the reluctance is a function of the thickness of the air gap 30 and is inversely proportional to the surface area of the air gap 30. The surface area can be increased by increasing the height or width of the termination 25 and switch 18 but this may not be desirable since it also increases the size of the electrical machine. The solution illustrated in FIG. 4 is to create a serrated connection between the termination 25 and the flux switch 18 thus increasing the surface area of the air gap 30 and reducing reluctance. FIG. 4 shows a serration with an angle of 45 degrees which increases the length of the region of contact and thus the surface area by 160%, and therefore decreasing the magnetic reluctance by 62%.

Figure 5:
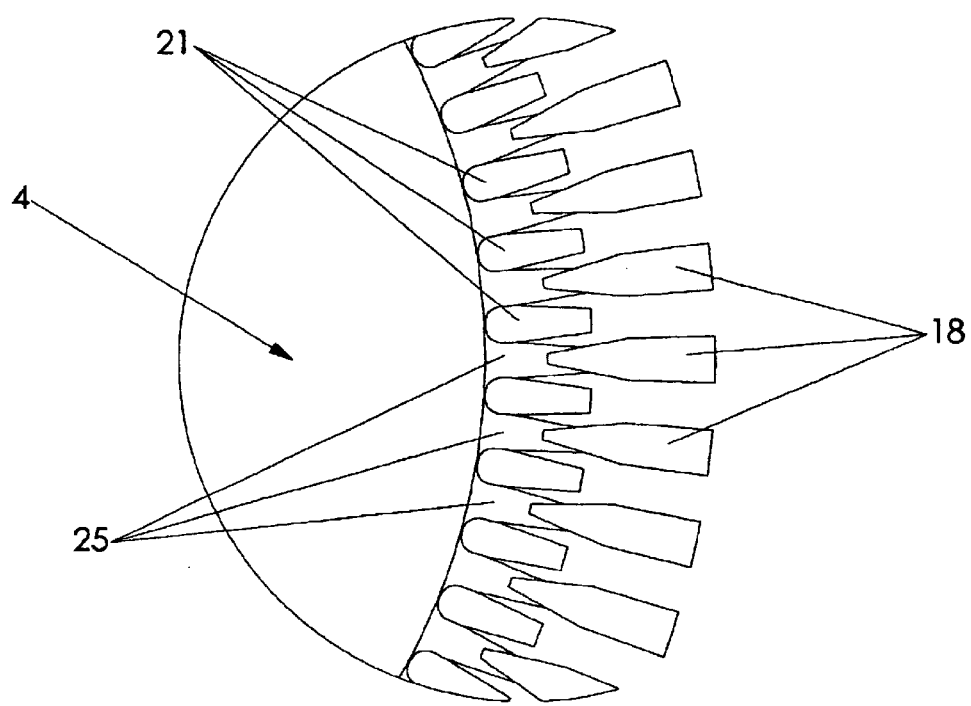
FIG. 5 shows a close-up plan view of a terminating end of a flux conductor and a flux switch according to an embodiment of the present invention.

FIG. 5 shows a top view of flux switches 18, several top terminations 25 of the south flux conductor 4 and several upper terminations 21 of the north flux conductor 6. A third aspect of the improvement of the present invention is shown in the tapered contacting edge of the flux switches 18 and flux conductor terminations 25, 21.

The interface between the flux conductors 4, 6 and the flux switches 18 is at a predetermined diameter. By way of example only, that diameter could be 6 inches which gives a circumference at the interface of 18.85 inches. If the terminations of the flux conductors 4, 6 and flux switches 18 have a non-tapered thickness of ⅛ inch (again, by way of example only) then it is necessary to have a gap of at least ⅛ inch between adjacent terminations of the same polarity at the interface diameter. This means that each termination and its respective gap occupy a total of ¼ inch at the 3 inch radius. This allows a total of 18.85 inches divided by 0.25 inches, or 75 poles. In practice, the number of poles would be somewhat lower because the air gap between adjacent flux conductors must be slightly larger than the thickness of the flux switch to avoid simultaneous contact between the flux switch 18 and two adjacent terminations of the same polarity.

However, by forming the flux the terminations 25, 21 of the flux conductors 4, 6 and flux switches 18 with tapered ends, the thickness of the terminations 25, 21 and flux switches 18 at the interface width is smaller and the gap can be made smaller. The terminations 23 and 27 are also taipered but are not shown in FIG. 5. For instance, if the terminations 25, 21 and flux switches 18 taper from ⅛ inch at the root of the serrations to 1/16 inch at the tip of the serrations (again, these dimensions are for illustration purposes only), then the thickness at the interface diameter would be approximately 3/32 inch. This means that the gap between adjacent terminations the same polarity only needs to be 3/32 inch for a total thickness of termination 25, 21 and respective gap of 3/16 inch. This allows a total number of poles of 18.85 inches divided by 3/16 inches, or 100 poles. In practice, the number of poles would be somewhat lower because the air gap between adjacent flux conductors must be slightly larger than the thickness of the flux switch to avoid simultaneous contact between the flux switch 18 and two adjacent terminations of the same polarity. Therefore, by providing tapered terminations to the flux conductors 4, 6 and flux switches 18, it may be possible to increase the number of poles by up to 33% for a given diameter machine. Conversely, rather than providing a larger number of poles for a given rotor diameter, it may be possible to reduce the electrical machine's diameter for a given number of poles by using tapered terminations 25, 21 on the flux conductors 4, 6 and the flux switches 18.

It can be seen from the preceding that the improvements of the present invention decrease flux leakage and flux impedance of the electrical machine described in co-pending U.S. patent application Ser. No. 10/273,238, It should be noted that while these improvements were only described in a single embodiment it is indented to illustrate the nature of the improvements and applies to all the embodiments described and implied by co-pending U.S. patent application Ser. No. 10/273,238 including a three phase machine, a machine with an internal rotor, etc. It should also be noted that the electrical machine of the present invention can be operated as either a motor or an alternator, as is the case with the device disclosed in U.S. patent application Ser. No. 10/273,238.

While an embodiment of the invention has been shown and described, it will be apparent to those skilled in the art that various modifications may be made without departing from the scope of the invention. Therefore, it is intended that the invention not necessarily be limited to the particular embodiment described and illustrated herein.

What is claimed is:

1. An electrical machine comprising:
    a magnet,
    an electrical conductor arranged to form a loop,
    a plurality of flux conductors which direct magnetic flux from said magnet through said loop of electrical conductor, wherein a first set of said flux conductors directs said magnetic flux through said loop in a first direction and a second set of said flux conductors directs said magnetic flux through said loop in a second direction, wherein said flux conductors comprise a plurality of north flux conductors in magnetically conductive contact with a north pole of said magnet and a plurality of south flux conductors in magnetically conductive contact with a south pole of said magnet wherein said north flux conductors and said south flux conductors are spaced from each other to substantially prevent flux leakage between said north flux conductors and said south flux conductors, and
    a switch for alternately connecting and disconnecting said first and second sets of flux conductors.

2. The electrical machine of claim 1 wherein said north flux conductors comprise a plurality of flux conductors with upper terminations but no lower terminations and a plurality of flux conductors with lower terminations but no upper terminations and wherein said south flux conductors comprise a plurality of flux conductors with upper terminations but no lower terminations and a plurality of flux conductors with lower terminations but no upper terminations and wherein said north and south flux conductors are arranged so that said switch alternately connects an upper termination of a north flux conductor to a lower termination of a south flux conductor and a lower termination of a north flux conductor to an upper termination of a south flux conductor.

3. The electrical machine of claim 1 wherein said north flux conductors and said south flux conductors are mounted in a non-interleaved arrangement.

4. The electrical machine of claim 1 wherein each of said flux conductors comprises a from panel and a back panel with relatively large surface areas and swide portions defined in between said front and back panel wherein said side portions have significantly smaller surface area than said front and back panels and wherein the front and back panels of said north flux conductors are in non-juxtaposed relationship to the front and back panels of said south flux conductors.

5. The electrical machine of claim 4 wherein the side portions of said north flux conductors are spaced from the side portions of said flux conductors by a distance sufficient to substantially prevent flux leakage between said north flux conductors and said south flux conductors.

6. The electrical machine of claim 1 wherein an interface between said flux conductors and said switch is formed by a side portion of said switch and terminations of said flux conductors and wherein said interface is serrated.

7. The electrical machine of claim 6 wherein said interface has a serration angle of approximately 45 degrees.

8. The electrical machine of claim 1 wherein said flux conductors comprise a termination end that is tapered in a radial direction such that the termination of each flux conductor has a thickness that is less than the thickness of the rest of the body of the flux conductor and wherein said switch is tapered in a radial direction such that a side portion of the witch that is located at the radially innermost extent of said switch has a thickness that is less than the thickness of the rest of the body of the switch.

* * * * *